(12) United States Patent
Nagasaku et al.

(10) Patent No.: US 6,478,947 B2
(45) Date of Patent: Nov. 12, 2002

(54) TREATMENT METHOD OF WASTE OIL OR WASTE EDIBLE OIL

(75) Inventors: Kohji Nagasaku, Tokyo (JP); Akira Matsunaga, Tokyo (JP); Sungrak Jang, Tokyo (JP)

(73) Assignee: Komeisha Corporation, Tokyo (JP)

( * ) Notice: Subject to any disclaimer, the term of this patent is extended or adjusted under 35 U.S.C. 154(b) by 111 days.

(21) Appl. No.: 09/758,614

(22) Filed: Jan. 12, 2001

(65) Prior Publication Data

US 2002/0036171 A1 Mar. 28, 2002

(30) Foreign Application Priority Data

Jul. 31, 2000 (JP) ........................................ 2000-230111
Nov. 6, 2000 (JP) ........................................ 2000-336940

(51) Int. Cl.$^7$ .............................................. C02F 1/461
(52) U.S. Cl. .................. 205/695; 205/696; 205/742; 205/746
(58) Field of Search ................................. 205/695, 696, 205/742, 746

(56) References Cited

U.S. PATENT DOCUMENTS

| 5,723,039 A | * | 3/1998 | Zosimov et al. ............ 205/696 |
| 5,947,135 A | * | 9/1999 | Sumida et al. ............. 134/95.3 |
| 6,218,556 B1 | * | 4/2001 | Pintauro ..................... 205/696 |

* cited by examiner

Primary Examiner—Arun S. Phasge
(74) Attorney, Agent, or Firm—Armstrong, Westerman & Hattori, LLP

(57) ABSTRACT

Glycerin is effectively produced from a waste oil by a method comprising adding a strongly alkaline reducing water obtained by electrolyzing water containing sodium chloride to a waste oil selected from the group consisting of a waste edible oil, a fossil fuel waste oil and a mixture thereof, and extracting natural glycerin or synthetic glycerin by chemical reaction. Further, reusable edible oil is produced from a waste edible oil by a method comprising electrolyzing an aqueous solution having an electrolyte in an electrolytic cell, mixing a strongly alkaline reducing water generated at a cathode side of the electrolytic cell with a waste edible oil under ordinary temperature condition, and conducting oil/water separation, thereby purifying the waste edible oil to an extent such that it can be edible.

13 Claims, 2 Drawing Sheets

TREATMENT METHOD OF WASTE OIL OR WASTE EDIBLE OIL

BACKGROUND OF THE INVENTION

1. Field of the Invention

The present invention relates to a method for recovering and utilizing an oil by regeneration treatment using a reducing water generated at a cathode side in electrolysis, as a link in recycling of a waste edible oil.

2. Description of the Related Art

Waste edible oils have conventionally been mainly subjected to combustion treatment, and only a part of waste edible oils has merely been utilized as a raw material for soaps or paints. However, in recent years it is pointed out the danger of de novo formation of dioxine originated from sodium chloride in the course of combustion, and it has been the recent trend that it is difficult to easily conduct combustion treatment of waste edible oils unavoidably contaminated with sodium chloride from food materials. In addition, Food Recycle Rule will be started in the year of 2001 from the standpoint of resource protection. Thus, it has been required to conduct recycling in any form regarding waste edible oils.

From the above standpoint, a method of forming a light-oil alternate fuel has recently been developed as a method of recycling a waste edible oil, other than the conventional method of forming soaps or paints. This method comprises adding methanol and a trace amount of a catalyst to a waste edible oil, heating the resulting mixture to conduct reaction, thereby forming methyl ester and glycerin. Methyl ester from which glycerin has been removed is purified (washed in water and dehydrated) and filtered to obtain a light-oil alternate fuel. This method has the advantages that time required for the overall steps is several hours, 95 liters of products can be recovered from 100 liters of a waste edible oil, and yield is very high. However, this method has the disadvantage that it is applied to only vegetable oils. Thus, this method does not conform to the actual circumstances that many waste oils contain animal oils. Further, this method needs construction of an efficient recovery system of waste edible oils as a raw material or an efficient supply system of fuels produced.

Many methods of regenerating waste edible oils and recovering and utilizing the same as an edible oil are proposed. However, cost increases in order to obtain a high quality oil, and for this reason, there has conventionally been no method that is practically conducted. In recent years, a method of filtering under reduced pressure heated waste edible oils using a paper-made filter containing active clay or a method of subjecting the waste edible oils to filtration treatment using active carbon have been developed as described in Japanese Patent Application Laid-open No. 2000-201621. Those methods can remove coloring components contained in oils, and as a result, the oil that is clear in appearance is obtained. Therefore, those methods are used to treat oils in which deterioration does not proceed and to reutilize the treated oils. However, those methods have low effect to decrease AV (acid value) that is a measure of deterioration of fats and oils. Therefore, in case that it is intended to treat waste edible oils having increased deterioration and therefore having high AV value, it is difficult in such methods to obtain products reaching an allowable level as an edible oil. Further, there is the problem in that uncomfortable odor remains in the treated oils. Thus, there remain various problems to be improved in order to promote the wide spread of such methods.

SUMMARY OF THE INVENTION

The present invention has been made in view of the above, and an object of the present invention is therefore to provide a treatment method of a waste oil, that can effectively produce glycerin even from waste oils containing animal oils.

Another object of the present invention is to provide a treatment method of a waste edible oil, that can obtain a re-utilizable edible oil even from a waste edible oil in which deterioration proceeds.

In order to solve the above problems, according to the present invention, there is provided a treatment method of a waste oil, which comprises adding a strongly alkaline water obtained by electrolyzing water containing sodium chloride to a waste edible oil and/or fossil fuel waste oil, and extracting natural glycerin or synthetic glycerin by chemical reaction.

According to the present invention, there is provided a treatment method of a waste edible oil, which comprises electrolyzing an aqueous solution having an electrolyte such as sodium chloride in an electrolytic cell, mixing a strongly alkaline reducing water generated at a cathode side of the electrolytic cell with a waste edible oil under ordinary temperature condition, and conducting oil/water separation, thereby purifying the waste edible oil to an extent such that it can be edible.

In the above-described treatment method, the electrolyte used is preferably one member selected from the group consisting of sodium chloride, sodium sulfate, sodium carbonate, potassium carbonate and calcium hydroxide.

Further, the treatment method comprises:

a method having a system comprising an electrolytic cell, a reaction tank and an oil/water separation means;

a method comprising ultraviolet irradiation or a combination of ultraviolet irradiation and addition of divalent iron ion in order to increase removability of peroxide; and a method having a system comprising a reservoir tank for waste edible oil and a reaction tank, each having an ultraviolet irradiation means arranged therein, or a system comprising a reservoir tank for waste edible oil having an ultraviolet irradiation means, and a reaction tank having an ultraviolet irradiation means and a divalent iron ion supply means arranged therein.

DETAILED DESCRIPTION OF THE INVENTION

Figure 1:
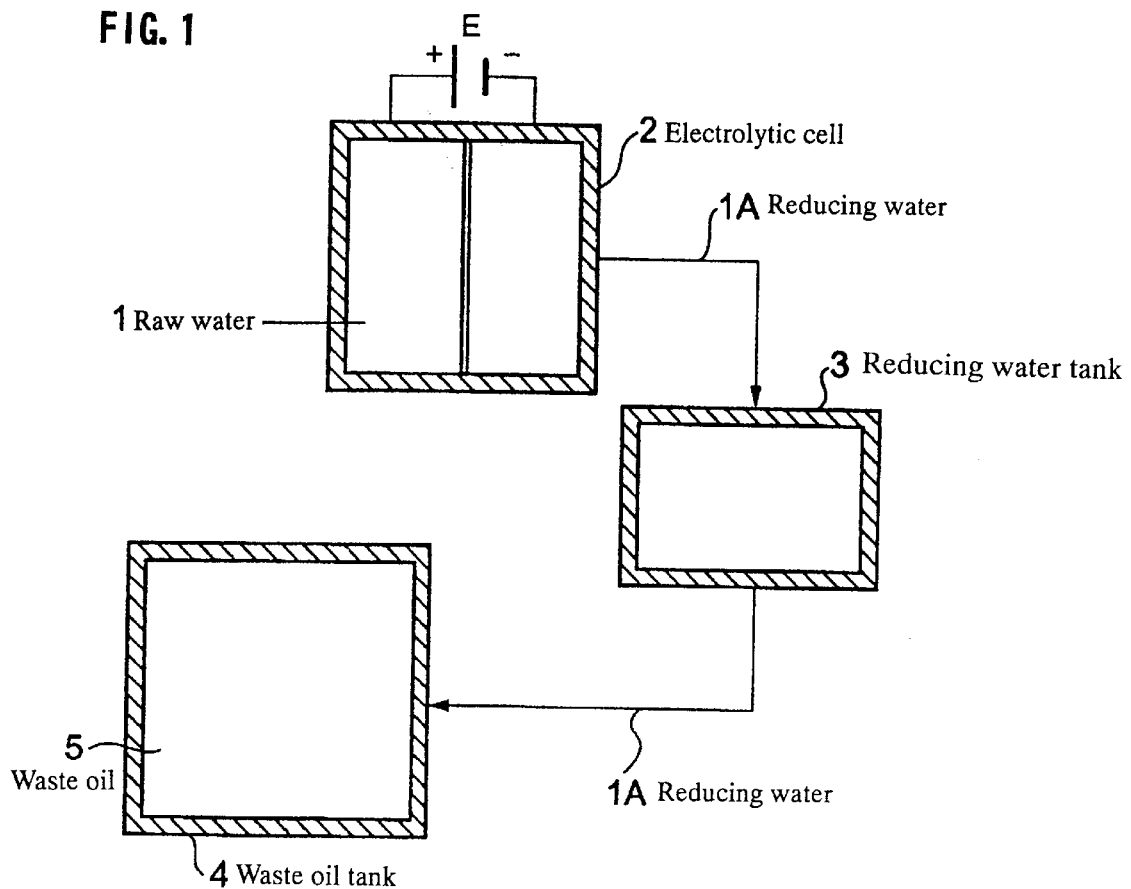
FIG. 1 is a systematic diagram of glycerin extraction method of the present invention.

The present invention is described in detail below.

Prior to specifically describing the treatment methods of the present invention, the definition of the terms used in the present invention is explained below.

The term "waste oil" used herein includes a waste edible oil, a fossil fuel waste oil and a mixture thereof.

The term "water containing sodium chloride" includes a fresh water having sodium chloride added thereto and sea water.

Water formed by electrolysis of water is called electrolytic water. The electrolytic water includes strongly electrolytic water and weakly electrolytic water. The strongly electrolytic water means water having an electrolysis promoter such as sodium chloride added thereto, or even in raw water to which such an electrolysis promoter is not added, water having strong properties obtained by increasing the degree of electrolysis by, for example, increasing current intensity or electrolysis time. On the other hand, the weakly electrolytic water means water obtained by using water to which an electrolysis promoter is not added (city water, or city water having calcium agent added thereto) as raw water and electrolyzing the raw water at low electrolysis intensity. Of the strongly electrolytic water, water generated at an anode side includes strongly acidic water (strongly acidic, strong oxidizing water) and weakly acidic, strong oxidizing water (soft oxidizing water). The strongly acidic water is used for sterilization in hospitals. Electrolytic water having strong reducing force generated at a cathode side simultaneously with the strongly acidic water is called strong reducing water. The strong reducing water has not conventionally had effective uses, and has been a dead water in many cases.

Of the weakly electrolytic water, water generated at an anode side is weakly acidic, weak oxidizing water, and is generally called weakly acidic water or weakly acidic, ionized water. This water is generated simultaneously with alkaline ionized water in an alkaline ionized water purifier, but does not have effective uses and is a dead water in many cases. Alkaline ionized water means alkaline, weak reducing water, and is generated at a cathode side by an alkaline ionized water purifier. Since free chlorine in city water is converted into harmless chlorine ion, such water is widely used as drinking water.

It will probably be appropriate that alkaline ionized water is formally called weakly alkaline reducing water, but is customarily called "(weak) alkaline ionized water" (there is weakly alkaline water even in strongly electrolytic water). The alkaline ionized water has pH of about 8 to 10.5 which is higher than that of city water, and low oxidation reduction potential (ORP) of about −0.1 to −0.4 V (city water has ORP of 0.5 to 0.75 V). It is known that the alkali ion water has efficacy to increase metabolism and nutrition, exhibit oxidation prevention, anti-acid and neutralization actions, absorb water to soften a material (swelling action), permeate taste well (permeation action), and exhibit surfactant action and oils and fats-emulsifying action.

The strong reducing water (hereinafter referred to as "reducing water" for simplicity) has properties of pH 11 to 12.5 (11 or higher), ORP −0.5 to −1.2 V (−0.6 V or lower), effective chlorine concentration 0.1 mg/l or less and dissolved oxygen concentration 5 mg/l or less, is strongly alkaline and has strong reducing force. It is known as the characteristics of the reducing water to have strong reducing force, retarded sterilization action that is weaker than strongly acidic water, strong dissolution, washing, separation and surfactant actions to organic substances, soluble proteins and oils and fats, and oils and fats emulsification action.

The treatment method of extracting glycerin from the waste edible oil is explained below by referring to FIGS. 1 and 2.

Figure 2:
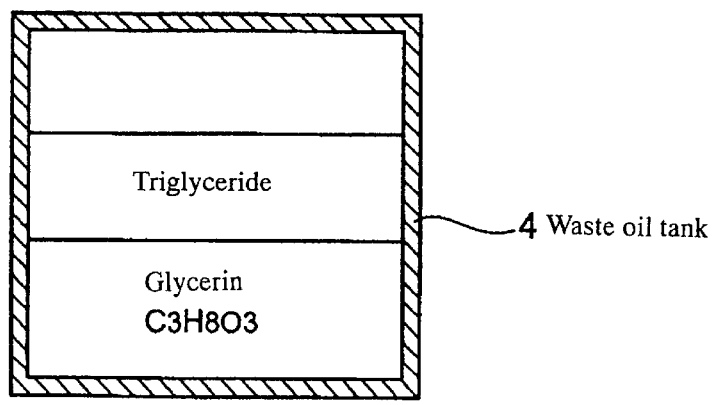
FIG. 2 is a view showing a separation state of a liquid obtained by the glycerin extraction method shown in FIG. 1.

As shown in FIG. 1, sea water or a material in the form of sea water prepared by adding sodium chloride to fresh water is incorporated as raw water 1 in an electrolytic cell 2 to which a battery E is connected. Strongly alkaline reducing water 1A obtained by electrolysis is incorporated in a reducing water tank 3. The reducing water 1A is introduced in a waste oil tank 4 having a waste edible oil or a fossil fuel waste oil 5 incorporated therein to extract glycerin at ordinary temperature or by heating.

In such a case, when the reducing water is mixed with a waste oil which has already been oxidized, an alkali component in the reducing water and triglyceride containing free fatty acid induce soap-making phenomenon and the fatty acid lifts on an upper layer. As a result, the fatty acid is in the state of being separated from glycerin ($C_3H_8O_3$) sunk as shown in FIG. 2. Consequently, glycerin can be extracted by providing an outlet at the bottom of the waste oil tank 4.

The "reducing water" in the state of the above embodiment means water having properties of pH 11 to 12.5 (11 or higher), ORP −0.5 to −1.2 V (−0.6 V or lower), effective chlorine concentration 0.1 mg/l or less and dissolved oxygen concentration 5 mg/l or less, as defined before.

Natural glycerin has conventionally been extracted by mixing chemicals such as sodium hydroxide with palm oil, heating the resulting mixture and separating fatty acid as an oil and natural glycerin. Synthetic glycerin is extracted by mixing sodium hydroxide with a fossil fuel and heating the resulting mixture.

The present invention uses the waste oil not only in which chemicals such as sodium hydroxide are mixed at all, however in which fatty acid and glycerin have already been separated from each other. Therefore, high temperature heating is not required, and it is not necessary to employ a means to mix chemicals with glycerin and distill off the chemicals in the course of its purification step. Thus, glycerin which does not contain any residual chemicals can very easily be extracted. Further, since the waste oil which has already been oxidized is used, it is an extraction method commensurate with resource recycling, resulting in great reduction in production cost.

The treatment method of the waste edible oil that is another embodiment of the present invention is explained below by referring to FIG. 3.

Figure 3:
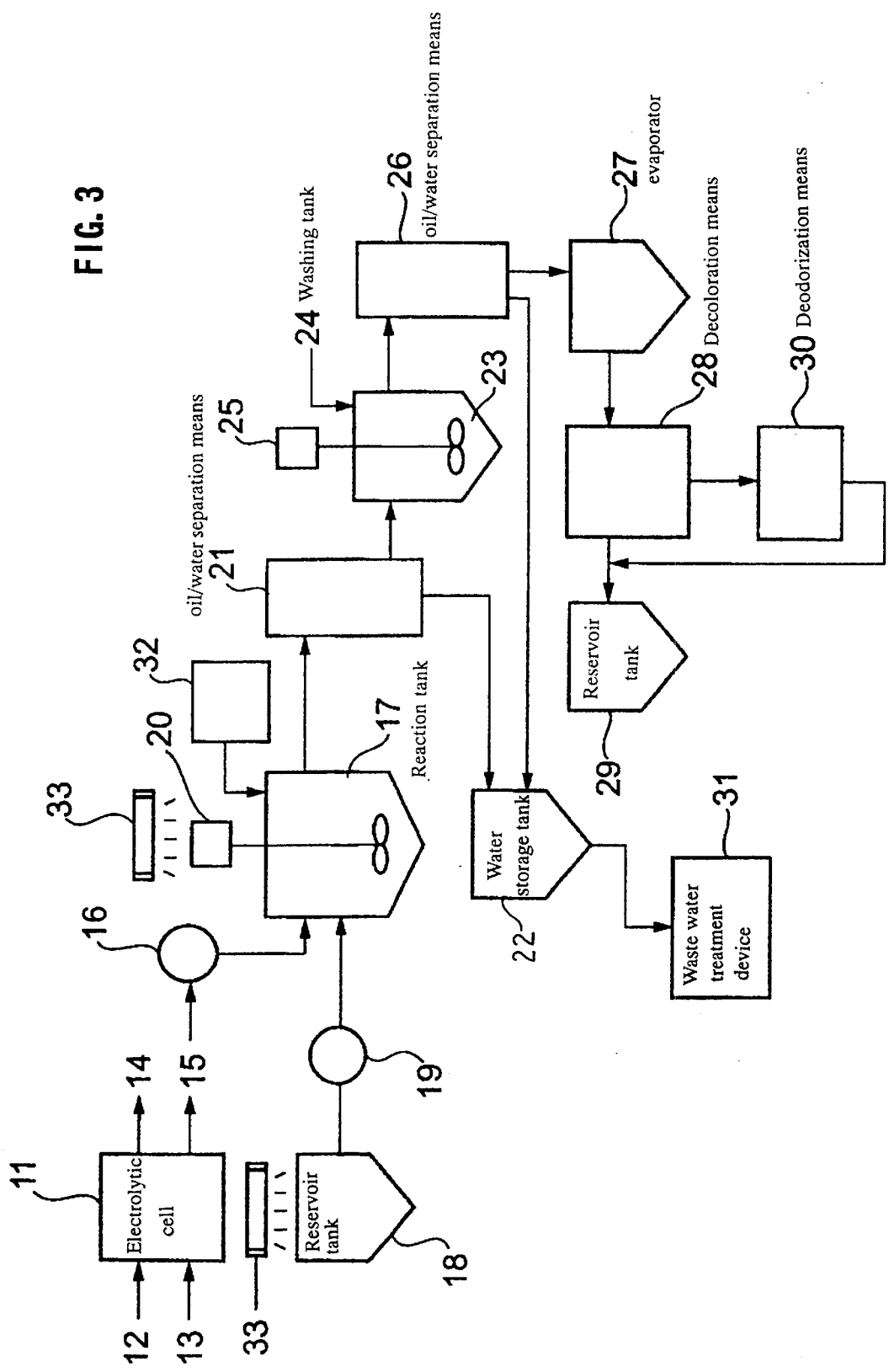
FIG. 3 is a systematic diagram of a method of extracting a regenerated oil by treating a waste edible oil according to the present invention.

In FIG. 3, reference numeral 11 is an electrolytic cell which conducts electrolysis by supplying water 12 and. an electrolyte 13 thereto and passing electric current therethrough. Oxidizing water 14 and reducing water 15 can be formed at an anode side and a cathode side, respectively. The electrolyte can be any material so long as it is the salt which can be soluble in water. Sodium chloride is advantageously used in that it has small change in solubility to temperature change and is inexpensive. The acid water (oxidizing water) formed together with the reducing water can be used for sterilization. However, when sodium chloride is used, chlorine is dissolved in acidic water, and a part of chlorine scatters in air. Therefore, use of sodium sulfate, sodium carbonate, potassium carbonate or the like which does not have the possibility to evolve chlorine is appreciated from the standpoint of sanitary safety. The electrolytic cell used in the present invention is one produced and sold by some manufacturers in Japan for the, purpose of forming acidic water for sterilization, and is provided with a water softener for pretreatment. The reducing water 15 is flown in a reaction tank 17 by a reducing water supplying pump 16.

On the other hand, untreated waste edible oil stored in a reservoir tank 18 for waste edible oil is flown in the reaction tank 17 by a waste edible oil supplying pump 19, and mixed with stirring by means of a stirrer 20 arranged in the tank.

The oil is emulsified to form an emulsion. The mixed liquid flown from the reaction tank 17 is then separated in oil and water by a first oil/water separation means 21. The oil/water separation means 21 includes an apparatus using a centrifugal separator or a membrane, a separating funnel and a large-sized apparatus of the separating funnel.

If the emulsion is allowed to stand, there may be such a specific case that an emulsion demulsifies in about 30 minutes. However, in case that a waste edible oil has a high acid value, demulsification is insufficient and the acid value does not drop so much in many cases. In such a case, water separates, but oil is in the emulsified state. Therefore, the emulsified oil is returned to the reaction tank 17 to again conduct reducing water go treatment. The emulsified oil is again introduced in the first oil/water separation means 21. When the emulsion is mixed with hydrochloric acid-acidic water in the same amount as that of the reducing water, the emulsion demulsifies to separate it into oil and water. The hydrochloric acid-acidic water preferably has pH of about 2.5 which is the same as that of a strongly acidic water. The reason for using the hydrochloric acid-acidic water is to prevent formation of harmful organic chlorine compounds even in slight amount by reacting free chlorine with, oil. In case that regenerated oil is used other than for food, strongly acidic water formed by electrolysis can be used for demulsification of the emulsion.

Water separated is stored in a water storage tank 22. On the other hand, oil separated is introduced in a washing tank 23, washing water (or hot water) 24 is supplied thereto, and those are mixed by a stirrer 25. Washing is conducted to remove salt component.

The oil/water mixed liquid from the washing tank 23 is then separated in oil and water by a second oil/water separation means 26. This second oil/water separation means is the same as in the first oil/water separation means. Moisture contained in the oil separated is removed by a heating tank 27 or an evaporator. Coloring component is then removed from the oil by a decoloring means 28. The decoloring means includes a method of heating the oil to about 110° C. and then filtering the heated oil with a filter containing active clay or active carbon. The oil thus decolored is introduced in a regenerated (processed) oil storage tank 29, and stored for a period of time until consignment or regeneration. Water separated by the second oil/water separation means 26 is stored in the water storage tank 22. The oxidizing water 14 can be used as a washing water for oil, and has the action to neutralize an alkaline reducing water. If the oxidizing water is not used as a washing water, it is stored in the water storage tank 22. In some cases, oil filtered under heating with active clay may have odor of the active clay itself or residual uncomfortable odor of untreated oil. In such a case, the oil is deodorized by a deodorizing means 30. The deodorizing means includes a method of placing ginger slices in a metal net, placing the metal net in the oil, and heating the oil to 130° C. Water separated by the second oil/water separation means 26 is stored in the water storage tank 22. The oxidizing water 14 can be used as the washing water for oil, and has the action to neutralize an alkaline reducing water. If the oxidizing water is not used as the washing water, it is stored in the water storage tank 22. The water stored can be utilized as liquid fertilizer in case of using soap water or potassium salt. If there is no such a use, the water stored is treated with a waste water treatment device 31. The wasted water treatment method is that calcium salt is added to the water (actually, calcium hydroxide is added to the water and pH of such water is adjusted by hydrochloric acid) to form calcium soap, and the calcium soap is separated by precipitation. Moisture contained in the calcium soap is removed, and such a calcium soap is used as fertilizers, feeds, water-proofing agents for concrete, asphalt fillers and the like. Water from which calcium soap has been separated has water quality that can be exhausted in sewerage. However, if necessary, the water may be subjected to a biological treatment or an advanced treatment.

The above explanation is a basic system of the waste edible oil treatment, and the following auxiliary system may be added to the basic system. This auxiliary system is applied to the case that a waste edible oil has high POV, and a divalent iron ion supply means 32 and an ultraviolet irradiation device 33 are arranged in the reaction tank 17. Divalent iron ion is supplied in an appropriate amount, and is mixed under stirring with reducing water under ultraviolet irradiation. Only ultraviolet irradiation may be conducted without supplying divalent iron ion. Further, if necessary, the ultraviolet irradiation device 33 may also be arranged in the reservoir tank 18 for waste edible oil.

EXAMPLE

The present invention is described in more detail by reference to the following examples, but the invention should not limited to those.

Electrolytic reducing water treatment of a waste edible oil is a very simple method such that a solution added with an electrolyte such as sodium chloride is electrolyzed in an electrolytic cell having a diaphragm arranged therein, and reducing water having a strong alkalinity (pH 11 to 12.5) and oxidation reduction potential (ORP: −0.5 to −1.2 V) formed at a cathode side is mixed with a waste edible oil under ordinary temperature condition. Examples of regeneration of a waste edible oil and effects thereof are as follows.

I. Removal of Free Fatty Acid

In the course of making fried foods, moisture in food materials contaminates in an edible oil used and hydrolysis of oil (triglyceride) occurs under high temperature, so that free fatty acid is contained in a waste edible oil. Concentration of this free fatty acid is indicated as an acid value (AV), and becomes a measure of deterioration of oil. Free fatty acid in the waste edible oil comprises a higher fatty acid such as oleic acid as a main component, and the higher fatty acid is insoluble in water. The higher fatty acid is reacted with an alkaline component contained in reducing water as shown in the following reaction formula (1) to form soap. Soap is soluble in water, and is removed from oil by conducting oil/water separation.

$$RCOOH + NaOH \rightarrow RCOONa + H_2O \qquad (1)$$

The waste edible oil has an acid value in a range of 1 to 5 in many cases, but the acid value thereof can be decreased to 0.3 or less which is an allowable level for acid value of edible fats and oils by this treatment.

II. Lightening and Removal of Uncomfortable Odor

Soap has a surface active action, and therefore oil emulsifies when soap is added thereto. Emulsification is remarkable when oils and fats having relatively high acid value and having progressed deterioration are treated with soap. Contrary to this, when fresh oil is treated with reducing water, the fresh oil does not substantially emulsify. Subjecting emulsified liquid to oil/water separation has the same effect as being washed, and coloring component and uncomfortable odor are removed by being dissolved in water.

III. Removal of Peroxide

Subsequent to electrolytic reducing water treatment, decoloration is conducted by filtration under heating using active clay. Peroxide vale (POV) decreases in the course of this decoloration. Peroxide means hydroperoxide formed by bonding oxygen to the adjacent site of a double bond present in oil during storage of oil, and is one kind of active oxygen. Peroxide value may decrease in electrolytic reducing water treatment, but peroxide value increases in many cases. However, it is known that peroxide value decreases by heating. In most cases, peroxide value can be decreased to 10 meq/kg or less, and also 3 meq/kg or less which is a standard value of a fresh oil, by filtration under heating. Removal effect of free fatty acid and peroxide is explained below by referring to the following actual example (Example 1).

Results obtained in Example 1 are shown in Table 1 below.

TABLE 1

Influence that electrolysis promoter gives to acid value decreasing effect in reducing water treatment of waste edible oil
(Waste edible oil: reducing water volume mixing ratio, 1:1)

| Sample No. | Kind and concentration of electrolysis promoter | Acid value of untreated waste oil | Acid value (average) after reducing water treatment | Decreased amount (average) of acid value by reducing water treatment | Oil/water separation |
|---|---|---|---|---|---|
| 1 | $K_2CO_3$, 3% | 2.89 | 0.04 (0.05) | 2.85 (2.73) | N |
| 2 |  | 2.65 | 0.05 | 2.60 | N |
| 3 | $K_2CO_3$, 1% | 2.33 | 0.11 (0.29) | 2.22 (1.47) | H |
| 4 |  | 1.13 | 0.09 | 1.04 | H |
| 5 |  | 1.84 | 0.68 | 1.16 | W |
| 6 | $Na_2SO_4$, 3% | 3.21 | 1.99 (2.65) | 1.22 (1.20) | N |
| 7 |  | 4.30 | 3.12 | 1.18 | N |
| 8 | NaCl, 0.1% | 3.11 | 2.82 (1.89) | 0.29 (1.10) | N |
| 9 |  | 0.90 | 0.19 | 0.71 | B |
| 10 |  | 3.61 | 1.55 | 2.06 | W |
| 11 |  | 4.96 | 3.67 | 1.29 | C |
| 12 |  | 3.44 | 1.95 | 1.49 | N |
| 13 |  | 1.58 | 0.45 | 1.03 | N |
| 14 |  | 4.08 | 2.93 | 1.05 | N |
| 15 |  | 3.63 | 2.14 | 1.49 | N |
| 16 |  | 3.27 | 2.14 | 1.13 | N |
| 17 |  | 1.74 | 0.50 | 1.24 | N |
| 18 |  | 1.04 | 0.29 | 0.75 | N |
| 19 |  | 4.21 | 3.99 | 0.22 | N |

N: Natural separation, B: Aluminum sulfate addition, C: Centrifugal separation, H: Hot water pouring separation, W: Water pouring separation Results are shown in case of conducting all reducing water treatments one time.

As shown in Table 1, the kind and concentration of the electrolysis promoter gives an influence to removal effect of free fatty acid, i.e., acid value decreasing effect, in reducing water treatment of a waste edible oil. Mixing ratios of waste oil to reducing water in the mixed solution was all 1:1. In Table 1, a device used for forming electrolytic water differs between Sample Nos. 1 to 7 and Sample Nos. 8 to 19. In the former, salts other than sodium chloride can be used as an auxiliary electrolyte by changing a concentration thereof. On the other hand, in the latter, only about 0.1% sodium chloride is used. In the former, in case of using 3% and 1% potassium carbonate, acid value after reducing water treatment is low as 0.05 to 0.29 on the average, and the decreased amount of acid value by reducing water treatment is large as 2.73 to 1.47 on the average. Thus, free fatty acid is efficiently removed. However, in case of using 3% sodium sulfate, removal effect is low. Further, in the latter, the average acid value after reducing water treatment is high as 1.89, and the decreased amount of acid value is small as 1.10 on the average. It is likely that removal effect of free fatty acid is influenced by quality (good or bad) of oil/water separation, and in particular, Sit is observed that scatter of the removal effect is large in natural separation.

In case of using sodium chloride in a concentration of 0.1%, removal effect of free fatty acid is low. Therefore, unless mixing ratio of reducing water to waste oil is increased except that untreated waste oil has low acid value, it is impossible to achieve an acid value of 0.3 or less which is a standard value of a fresh oil, by one treatment. On the other hand, in case of using potassium carbonate in a concentration of 1–3%, it is possible to achieve an acid value of 0.3 or less by one treatment.

Table 2 shows decreasing effect of acid value in the case of Example 2 wherein a waste oil treatment by an alkali in place of electrolytic water was conducted. The pH of NaOH solution is 13 at 0.1N and 12 at 0.01N, and the pH of reducing water is in a range of 12.4 to 11.7. Therefore, intensity as an alkali of reducing water is equal to 0.02–0.005N NaOH, and it is suggested that the acid value decreasing effect greatly fluctuates even by a small pH change in the vicinity of pH 12. From this fact, it is substantially impossible to decrease an acid value by treating a waste oil with alkali ion water having pH of 8 to 10.5 although the waste oil is emulsified. When a waste oil was actually treated with alkali ion water, there was no difference in this fact.

In case of using sodium carbonate solution, if its concentration is 0.5% or more, it is seen that an acid value decreasing effect is high as compared with the use of reducing water formed by adding 0.1% sodium chloride. This is because fatty acid is a weak acid, but is a strong acid than carbonic acid, the reaction shown in the following reaction formula (2) proceeds.

$$RCOOH + Na_2CO_3 \rightarrow RCOONa + NaHCO_3 \qquad (2)$$

Reducing water containing sodium carbonate or potassium carbonate as an auxiliary electrolyte increases intensity as an alkali, and an effect of decreasing an acid value, which is inherently possessed by those soluble carbonates, is strengthened. Therefore, it is advantageous to use such an auxiliary electrolyte as compared with the use of sodium chloride. Even in case of adding a powder of calcium hydroxide and removing calcium soap formed by filtration, free fatty acid is removed. If the acid value decreasing effect is insufficient in reducing water formed from sodium chloride, the acid value can sufficiently be decreased even in case of treating a waste edible oil having high acid value if sodium carbonate, potassium carbonate, calcium hydroxide or the like is added.

TABLE 2

Decrease in acid value of waste oil by addition of sodium hydroxide solution, sodium carbonate solution or calcium hydroxide
(Waste edible oil: sodium hydroxide solution volume mixing ratio, 1:1)

|  | Acid value | Decreased amount of acid value |
|---|---|---|
| Untreated waste oil | 4.21 | — |
| 0.1 N, NaOH solution treatment | 0.34 | 3.87 |
| 0.05 N | 1.83 | 2.38 |
| 0.02 N | 3.10 | 1.11 |
| 0.01 N | 3.90 | 0.31 |
| 2%, $Na_2CO_3$ solution treatment | 0.43 | 3.78 |
| 1% | 0.66 | 3.55 |
| 0.5% | 1.61 | 2.60 |
| 0.1% | 3.36 | 0.85 |
| 1 Equivalent, calcium hydroxide treatment | 1.62 | 2.59 |

TABLE 2-continued

Decrease in acid value of waste oil by addition of sodium hydroxide solution, sodium carbonate solution or calcium hydroxide
(Waste edible oil: sodium hydroxide solution volume mixing ratio, 1:1)

| | Acid value | Decreased amount of acid value |
|---|---|---|
| 2 Equivalent, calcium hydroxide treatment | 1.46 | 2.75 |
| 3 Equivalent, calcium hydroxide treatment | 1.10 | 3.11 |
| 5 Equivalent, calcium hydroxide treatment | 0.38 | 3.83 |
| 10 Equivalent, calcium hydroxide treatment | 0.34 | 3.87 |

Table 3 shows treatment result of reducing water treatment of a waste edible oil as Example 3. It is seen that the presence or absence of heat filtration step gives influence on peroxide value of a processed oil. Experiment Nos. 1 to 7 have no heat filtration step. Peroxide value of the processed oil is in a range of 1.4 to 11.1, and its average value was 6.2. On the other hand, in Experiment Nos. 8 to 14 involving heat filtration step, the peroxide value is in a range of 0.7 to 8.3, and its average value was 3.8. Therefore, it is concluded that the heat filtration has the effect to decrease peroxide value, and it is also not impossible to achieve the peroxide value of 3 meq/kg or less which is a standard of a oil.

TABLE 3

Treatment result of reducing water treatment system of a waste edible oil

| | Untreated waste oil | | Processed oil | | |
|---|---|---|---|---|---|
| Experiment No. | Acid value | Peroxide value (meq/kg) | Acid value | Peroxide value (meq/kg) | Filtration step |
| 1 | 2.65 | 2.2 | 0.04 | 4.6 | None |
| 2 | 2.89 | 1.4 | 0.04 | 5.7 | None |
| 3 | 2.33 | 4.1 | 0.08 | 5.6 | None |
| 4 | 1.13 | 3.6 | 0.33 | 5.9 | None |
| 5 | 3.04 | — | 0.20 | 11.1 | None |
| 6 | 3.21 | 2.1 | 0.25 | 1.4 | None |
| 7 | 4.30 | 12.5 | 0.65 | 9.4 | None |
| 8 | 0.79 | 1.6 | 0.29 | 1.7 | Present |
| 9 | 0.90 | 2.7 | 0.26 | 3.4 | Present |
| 10 | 4.96 | 9.6 | 0.68 | 3.6 | Present |
| 11 | 3.61 | 15.1 | 1.24 | 0.7 | Present |
| 12 | 4.08 | 12.0 | 1.58 | 7.6 | Present |
| 13 | 3.63 | 14.0 | 1.80 | 8.3 | Present |
| 14 | 3.44 | 18.8 | 0.68 | 1.1 | Present |

In case that acid value was not sufficiently decreased by only one treatment with reducing water, the plurality of treatments were conducted. In such a case, a part of samples was subjected to oil/water separation with hydrochloric acid-acidic water.

IV. Removal of Peroxide by Auxiliary System

Different from de-acid using sodium hydroxide solution, electrolytic reducing water treatment has a latent possibility of removing peroxide by the action of active hydrogen (atomic hydrogen or hydrogen radical) contained in reducing water. However, actually it is difficult to decrease peroxide value in general reducing water treatment. The peroxide value is decreased in heat filtration treatment, but it is desirable to decrease the peroxide value as much as possible in a pre-stage. The reaction steps of peroxide (organic hydroperoxide) with active hydrogen are shown in the following reaction formulae (3), (4) and (5).

$$ROOH \rightarrow RO\cdot + \cdot OH \quad (3)$$

$$RO\cdot + H\cdot \rightarrow ROH \quad (4)$$

$$H\cdot + \cdot OH \rightarrow H_2O \quad (5)$$

The step of the reaction formula (3) wherein peroxide is decomposed in alkoxyl radical and hydroxyl radical is a rate-determining step, and it is considered that decomposition of the reaction formula (3) is difficult to proceed in general reducing water treatment.

It is a known fact that addition of divalent iron ion or ultraviolet irradiation promotes decomposition of peroxide, i.e., reaction of the reaction formula (3). However, if active hydrogen is not present, deterioration of oils and fats is promoted. On the other hand, if active hydrogen is present, alkoxyl radical is used to form an alcohol as shown in the formula (4), and hydroxyl radical is used to form water. Therefore, it is considered that peroxide can be removed by combining addition of divalent iron ion or ultraviolet irradiation with reducing water treatment.

Table 4 shows measurement result of peroxide in a system involving addition of divalent iron ion, ultraviolet irradiation or the like as Example 4. Ultraviolet irradiation has the effect to decrease peroxide value when it is conducted prior to reducing water treatment as well as after mixing reducing water. The peroxide value was decreased the half by irradiation for 4 hours. By further adding divalent iron ion, the peroxide value was decreased 1/3 even by irradiation for 1 hour by a synergistic effect.

TABLE 4

Measurement of peroxide value of waste edible oil by electrolytic reducing water under addition of divalent iron ion and ultraviolet irradiation

| | Peroxide value (meq/kg) |
|---|---|
| Untreated waste edible oil | 12.61 |
| Reducing water treatment (no addition of FeSO$_4$, no ultraviolet irradiation) | 11.77 |
| Reducing water treatment (ultraviolet irradiation for 1 hour) | 10.21 |
| Reducing water treatment (ultraviolet irradiation for 4 hours) | 5.68 |
| Ultraviolet irradiation for 1 hour and then reducing water treatment | 12.11 |
| Ultraviolet irradiation for 4 hours and then reducing water treatment | 6.87 |
| FeSO$_4$ (1 g/l liter of oil) added-reducing water treatment, and ultraviolet irradiation for 1 hour | 4.20 |

Table 5 shows water quality and the waste water quality standards in case of flocculating and precipitating the waste water obtained by oil/water separation in the course of reducing water treatment of a waste oil, with calcium hydroxide, filtering off the precipitates, and diluting the water thus treated with acidic water to 2 times, as Example 5. As far as the results obtained are concerned, it is allowable to discharge such treated water to sewerage. BOD causing substance will be glycerin.

TABLE 5

Water quality of waste water after flocculating and precipitating with calcium hydroxide, filtering off, and diluting with strongly acidic water to two times

| Analytical items | Measurement value | Waste water quality (discharged to sewerage) |
|---|---|---|
| BOD (Biochemical oxygen demand) | 55 mg/l | 160 mg/l or less |
| COD (Chemical oxygen demand) | 29 mg/l | 160 mg/l or less |
| SS (Suspended substance) | 5 mg/l or less | 200 mg/l or less |
| n-Hexane extracted substance | 5 mg/l or less | 30 mg/l or less (Animal and vegetable fats and oils) |

As described above, the present invention can attempt effective utilization of resources and recycling thereof by purification processing waste edible oils which have conventionally been disposed, to convert to re-usable fats and oils (glycerin, edible oil and the like).

What is claimed is:

1. A treatment method of a waste oil, which comprises adding a strongly alkaline reducing water obtained by electrolyzing water containing sodium chloride to a waste oil selected from the group consisting of a waste edible oil, a fossil fuel waste oil and a mixture thereof, and extracting natural glycerin or synthetic glycerin by chemical reaction.

2. A treatment method as claimed in claim 1, wherein said water containing sodium chloride is water prepared by adding sodium chloride to fresh water, or sea water.

3. A treatment method as claimed in claim 1, wherein said strongly alkaline reducing water has at least pH of 11 to 12.5 and oxidation reduction potential (ORP) of −0.5 to −1.2 V.

4. A treatment method of a waste edible oil, which comprises electrolyzing an aqueous solution having an electrolyte in an electrolytic cell, mixing a strongly alkaline reducing water generated at a cathode side of the electrolytic cell with a waste edible oil under room temperature condition, and conducting oil/water separation, thereby purifying the waste edible oil to an extent such that it can be edible.

5. A treatment method as claimed in claim 4, which further comprises a step of recovering the treated oil by conducting water washing, dehydration and heat filtration after the oil/water separation.

6. A treatment method as claimed in claim 5, wherein said heat filtration is conducted using active clay, and deodorization is conducted by heating the treated oil and frying ginger slices in the heated oil.

7. A treatment method as claimed in claim 4 or 5, wherein calcium hydroxide is added to water after the oil/water separation to flocculate and precipitate the same as a calcium soap, and the water containing the precipitated calcium soap is mixed with a strongly acidic water, thereby obtaining the calcium soap and water capable of being discharged to sewerage.

8. A treatment method as claimed in claim 4 or 5, wherein said strongly alkaline reducing water has at least pH of 11 to 12.5 and oxidation reduction potential of −0.5 to −1.2 V.

9. A treatment method as claimed in claim 4, which is conducted by a system comprising a reservoir tank for waste edible oil and a reaction tank, each having an ultraviolet irradiation means arranged therein, and a system comprising a reservoir tank for waste edible oil having an ultraviolet irradiation means arranged therein, and a reaction tank having an ultraviolet irradiation means and a divalent iron ion supplying means arranged therein.

10. A treatment method as claimed in claim 4, wherein said oil/water separation comprises a method of mixing a strongly acidic water with an emulsion, or a method of mixing a hydrochloric acid-acidic water having pH adjusted to around 2.5 in place of a strongly acidic water containing free chlorine.

11. A treatment method as claimed in claim 4, wherein said electrolyte is at least one member selected from the group consisting of sodium chloride, sodium sulfate, sodium carbonate, potassium carbonate and calcium hydroxide.

12. A treatment method as claimed in claim 4, which is conducted by a system comprising an electrolytic cell, a reaction tank and an oil/water separation means.

13. A treatment method as claimed in claim 4, which further comprises ultraviolet irradiation or a combination of ultraviolet irradiation and addition of divalent iron ion to increase removal ability of peroxide.

* * * * *